(No Model.)
D. E. BARTON.
CULTIVATOR ATTACHMENT.
No. 451,253. Patented Apr. 28, 1891.
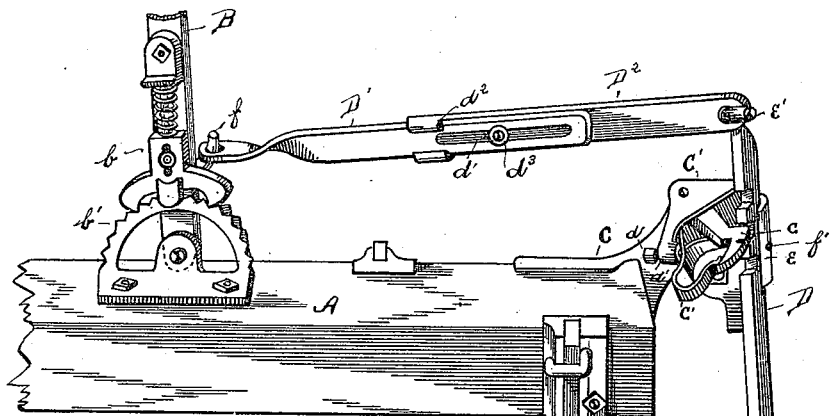
Fig. 1.
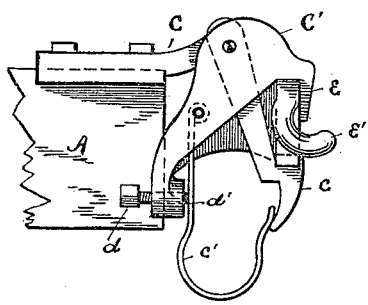
Fig. 3.
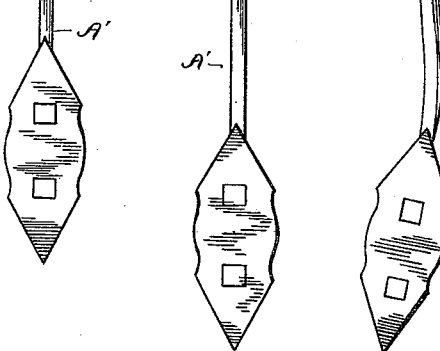
Fig. 2.
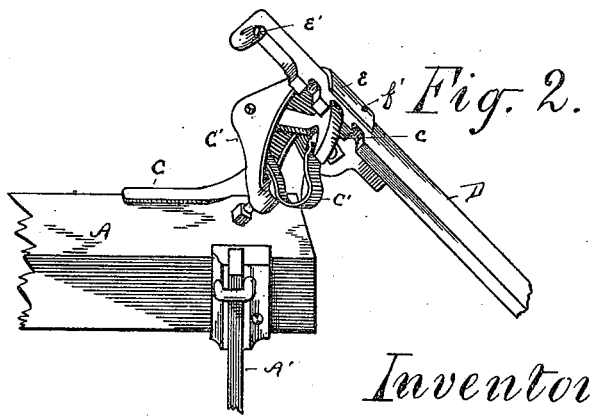
Witnesses.
J. H. Monteverde
Frank D. Lewis
Inventor
Delbert E. Barton
By Boone & Acker

UNITED STATES PATENT OFFICE.

DELBERT E. BARTON, OF SAN FRANCISCO, CALIFORNIA.

CULTIVATOR ATTACHMENT.

SPECIFICATION forming part of Letters Patent No. 451,253, dated April 28, 1891.

Application filed September 24, 1890. Serial No. 365,987. (No model.)

*To all whom it may concern:*

Be it known that I, DELBERT E. BARTON, a citizen of the United States, residing at San Francisco, in the county of San Francisco and State of California, have invented certain new and useful Improvements in Cultivator Attachments; and I do hereby declare the following to be a full, clear, and exact description of said invention, such as will enable others skilled in the art to which it most nearly appertains to make, use, and practice the same.

My invention has relation to certain new and useful improvements in cultivators, harrows, or plow attachments, which consists of the parts and details of construction, as will be hereinafter more fully set forth in the drawings, described, and pointed out in the specification.

The object of my invention consists in providing an attachment for cultivators, harrows, plows, or the like, which will permit of the cultivation around trees, stumps, or the like without necessitating the turning of the cultivator from its direct line of movement.

A further object of my invention is to provide for the lateral motion of the attachment and for the rearward movement of the tooth when contacting with stumps, stones, roots, or the like, thereby preventing breakage resulting thereto; and to these ends my invention consists in the novel arrangement and combinations of parts hereinafter disclosed.

Referring to the drawings forming a part of this application, wherein similar letters of reference are used to denote corresponding parts throughout the entire specification and several views, Figure 1 is a front view in elevation; Fig. 2, a detail view showing the attachment thrown outward, and Fig. 3 a top plan view.

The letter A is used to represent an ordinary cultivator-beam, provided with teeth A'. Upon said beam I secure the operating-lever B, to which is secured the automatically-adjustable catch $b$, which works on segment-rack $b'$. To the outer end of the beam I attach the metallic plate C, to which is pivotally secured the tooth-holding frame C'. Within said frame I pivotally locate the catch or dog $c$, and fasten spring $c'$, as clearly shown, the outer end of which contacts with the dog $c$ and tends to throw the latter outward. The tension of the spring is regulated by means of the thumb-screw $d$, which works in screw-threaded opening $d'$, formed in the projecting end of the frame.

The letter D indicates the cultivator-tooth, which is securely held against the wall or cheek $e$ of the frame by the toothed end of catch $c$ and tension of spring $c'$, as clearly shown. The upper end or top of the cultivator-tooth is reduced and formed into a hook $e'$. However, if so desired, the hooked portion may be constructed separate from the tooth proper. Connection is made between the operating-lever and cultivator-tooth through the medium of the adjustable connecting-rod, which consists of rods $D'$ $D^2$, one of which has an elongated opening $d'$ formed therein, and works in the guide end $d^2$ of the other. Projecting through the elongated opening is set-screw $d^3$, which is adapted to regulate the position or length of the rod. The outer ends of the connecting-rod fit over projection $f$, secured to the operating-lever and end of the cultivator-tooth. By throwing the lever inward the cultivator-tooth secured within the frame C' is caused to move outward, as more fully shown in Fig. 2, so as to enable the cultivation around the tree or stump without necessitating the movement of the cultivator from direct line of movement, and at the same time avoiding the liability of breakage or damage resulting to the cultivator-teeth proper by contact with stumps, &c. By throwing the lever outward the attached tooth is caused to move inward, so as to fall back of the cultivator-teeth proper or into line of draft, as shown in Fig. 1. By the adjustable connecting-rod I am enabled to regulate the throw of the attached tooth. As the tooth is thrown inward or outward the pivoted tooth-frame is thrown or moved to an incline corresponding to the throw of tooth D. (Clearly shown in Fig. 2.) The tooth is securely held in its adjusted position by means of tension-spring $c'$, which bears against dog or catch $c$, the toothed end of which rests over the face of said spring. However, in case the tooth should come in contact with heavy roots, stumps, rocks, or other obstructions, the forward movement of the cultivator will force the lower portion thereof rearward, and the pressure thereon will overcome the tension of spring $c'$ upon dog or catch $c$ and cause the upper portion of the tooth to move forward until the tooth is free thereof, when the same will swing upon its pivotal point or pin $f'$. Thus the attached tooth is prevented from breaking by contact with obstructions. As before stated, by means of the thumb-screw $d$ I am enabled to increase or decrease the tension of spring $c'$.

My invention will be found of the utmost importance in connection with orchard plows, owing to the fact that cultivation may take place between the trees without movement laterally of the cultivator proper, while without the herein-described attachment it becomes necessary in order to cultivate between the trees that the cultivator be turned from its direct line of draft, or that the cultivation be made between the same, thus delaying the cultivation of the orchard.

I am aware that minor changes may be made in the arrangement of parts and details of construction herein shown and described without necessitating or creating a departure from the nature and scope of my invention.

Having thus described my invention, what I claim as new, and desire to secure protection in by Letters Patent of the United States, is—

1. A cultivator attachment consisting of the tooth-retaining frame adapted to be pivotally attached to the cultivator-beam, spring-actuated dog or catch located therein, and tooth secured within the frame, said tooth being adapted through the medium of suitable mechanism to be thrown inward or outward, substantially as set forth.

2. In a cultivator attachment, the combination of the tooth-retaining frame, spring-actuated dog or catch located therein, thumb-screw for regulating the tension of the spring-actuated dog, and the cultivator-tooth held in position by the pressure of the dog, said tooth adapted upon contacting with obstructions to overcome the pressure of the spring-actuated dog and be thrown from its vertical position, so as to clear such obstructions, substantially as and for the purpose set forth.

3. In a cultivator attachment, the combination with the movable cultivator-tooth held in the retaining-frame by a spring-actuated dog and pivoted to the beam, of the operating-lever and the adjustable connecting-rod for securing the lever and tooth together and limiting or adjusting the movement or throw of the said tooth, substantially as and for the purpose set forth.

4. In a cultivator attachment, the combination of the tooth-retaining frame held in the retaining-frame by the spring-actuated dog and pivoted to the beam, spring-actuated dog or catch, cultivator-tooth movably secured within the frame, operating-lever, and the connecting-rod for securing the lever and tooth together, substantially as and for the purpose set forth.

In testimony whereof I affix my signature in presence of two witnesses.

DELBERT E. BARTON.

Witnesses:
N. A. ACKER,
P. A. WAGNER.